US008543912B2

(12) United States Patent
Yu

(10) Patent No.: US 8,543,912 B2
(45) Date of Patent: Sep. 24, 2013

(54) METHODS, SYSTEMS, AND COMPUTER PRODUCTS FOR IMPLEMENTING CONTENT CONVERSION AND PRESENTATION SERVICES

(75) Inventor: Ke Yu, Alpharetta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 776 days.

(21) Appl. No.: 11/599,717

(22) Filed: Nov. 14, 2006

(65) Prior Publication Data

US 2008/0115162 A1    May 15, 2008

(51) Int. Cl.
*G06F 17/27* (2006.01)

(52) U.S. Cl.
USPC .......................................... 715/255; 715/730

(58) Field of Classification Search
USPC ................................. 715/255, 730
See application file for complete search history.

(56) References Cited

U.S. PATENT DOCUMENTS

| | | | | |
|---|---|---|---|---|
| 5,774,859 A * | 6/1998 | Houser et al. | | 704/275 |
| 5,899,975 A * | 5/1999 | Nielsen | | 704/270.1 |
| 6,411,685 B1 * | 6/2002 | O'Neal | | 379/88.14 |
| 7,035,804 B2 * | 4/2006 | Saindon et al. | | 704/271 |
| 7,043,477 B2 * | 5/2006 | Mercer et al. | | 1/1 |
| 7,188,353 B1 * | 3/2007 | Crinon | | 725/32 |
| 7,325,043 B1 * | 1/2008 | Rosenberg et al. | | 709/219 |
| 7,809,728 B2 * | 10/2010 | Takahashi et al. | | 707/741 |
| 8,081,860 B2 * | 12/2011 | Yoo et al. | | 386/239 |
| 2002/0091723 A1 * | 7/2002 | Traner et al. | | 707/205 |
| 2002/0129367 A1 * | 9/2002 | Devara | | 725/46 |
| 2002/0178007 A1 * | 11/2002 | Slotznick et al. | | 704/270.1 |
| 2003/0005447 A1 * | 1/2003 | Rodriguez | | 725/51 |
| 2003/0101150 A1 * | 5/2003 | Agnihotri et al. | | 706/45 |
| 2004/0006474 A1 * | 1/2004 | Gong et al. | | 704/270.1 |
| 2004/0117831 A1 * | 6/2004 | Ellis et al. | | 725/53 |
| 2004/0123324 A1 * | 6/2004 | Sazzad et al. | | 725/89 |
| 2004/0139480 A1 * | 7/2004 | Delpuch et al. | | 725/135 |
| 2004/0172254 A1 * | 9/2004 | Sharma et al. | | 704/270.1 |
| 2004/0181818 A1 * | 9/2004 | Heyner et al. | | 725/146 |
| 2006/0161425 A1 * | 7/2006 | Lee et al. | | 704/201 |
| 2006/0267995 A1 * | 11/2006 | Radloff et al. | | 345/530 |
| 2007/0156410 A1 * | 7/2007 | Stohr et al. | | 704/275 |

OTHER PUBLICATIONS

Abdulrahman Yarali and Ann Cherry, Internet Protocol Television (IPTV), Nov. 21-24, 2005, TENCON 2005, IEEE, p. 5.*
Andrew S. Tanenbaum, Structured Computer Organization, 1990, Prentice Hall Publishing, Fourth Edition, pp. 405-406.*

* cited by examiner

*Primary Examiner* — Doug Hutton, Jr.
*Assistant Examiner* — Andrew Dyer
(74) *Attorney, Agent, or Firm* — Cantor Colburn LLP

(57) ABSTRACT

Methods, systems, and computer products for content conversion and presentation enabled services for television and Internet Protocol television applications. In exemplary embodiments, the system and method identify program content having embedded text, apply a conversion to the program content to extract voice data and play voice data in conjunction with the program content.

9 Claims, 3 Drawing Sheets

METHODS, SYSTEMS, AND COMPUTER PRODUCTS FOR IMPLEMENTING CONTENT CONVERSION AND PRESENTATION SERVICES

BACKGROUND

The present invention relates generally to programming services, and more particularly, to methods, systems, and computer products for implementing content conversion and presentation services.

In many television (TV) and Internet Protocol television (IPTV) applications, there is often voluminous text displayed on the TV display screen such as, but not limited to, news (e.g., Yahoo® news, etc.) e-commerce applications (e.g., Ebay®, Amazon®, etc.), commercials with product descriptions, etc. to provide the viewer with various types of information. The presentation of this textual information can often be difficult to view and therefore can be counter-intuitive, distracting and disturbing for the viewer to visually read on the TV screen.

What is needed, therefore, is a way to present on-screen information in which a viewer has interest and need, and is presented in a manner that assists the viewer in discerning and possibly selecting from various on-screen content.

BRIEF SUMMARY

Exemplary embodiments include a method for providing content conversion and presentation services via a network, the method including identifying program content having embedded text, applying a content conversion to the program content to extract voice data and playing voice data in conjunction with the program content.

Additional exemplary embodiments include a system for providing content conversion and presentation services via a network, the system including a content services provider; and a content conversion and presentation application for executing on the content services provider system, the content conversion and presentation application having instructions to extract embedded text from program content, convert the extracted text into streaming voice data and broadcast the streaming voice data over the network.

Additional exemplary embodiments include a computer program product for providing text to speech services, the computer program product including instructions for implementing a method, including receiving program content, extracting text associated with the program content, converting the text to voice data, generating a play list and associating the text and the voice data with the play list.

Further exemplary embodiments include a computer-readable medium having program content data stored on the medium and representing a data structure, including a first program content datum stored in a first region of memory addresses in the medium, a second program content datum stored in a second region of memory addresses in the medium and an index stored in an index region of the memory addresses, the index storing an association between the first and second program content data, wherein a first predetermined data processing operation on the first program content datum causes a second predetermined data processing operation on the second program content datum.

Other systems, methods, and/or computer program products according to embodiments will be or become apparent to one with skill in the art upon review of the following drawings and detailed description. It is intended that all such additional systems, methods, and/or computer program products be included within this description, be within the scope of the exemplary embodiments, and be protected by the accompanying claims.

BRIEF DESCRIPTION OF DRAWINGS

Referring now to the drawings wherein like elements are numbered alike in the several FIGURES.

The detailed description explains the exemplary embodiments, together with advantages and features, by way of example with reference to the drawings.

DETAILED DESCRIPTION OF EXEMPLARY EMBODIMENTS

In accordance with exemplary embodiments, program content conversion and presentation services are provided. The program content conversion and presentation services enable text-to-voice conversion of the program content for Internet Protocol television (IPTV) systems and present the converted content via system-generated play lists as described herein. In exemplary embodiments, the program content conversion and presentation services extract the text that is embedded in TV and IPTV content and convert the text into voice for presentation via the viewer's TV system. For example, in a weather application, the weather forecast information can be audibly read to the TV viewer, rather than the viewer having to visually read the weather text on-screen. In exemplary embodiments, the content include text components of IPTV applications such as weather, news, ecommerce, voice on demand (VOD), digital video recorder (DVR, etc. In another example, when a TV viewer is browsing programming that includes music videos, video metadata such as name, title, genre, artist biography, description, etc., can be audibly read to the viewer.

Figure 1:
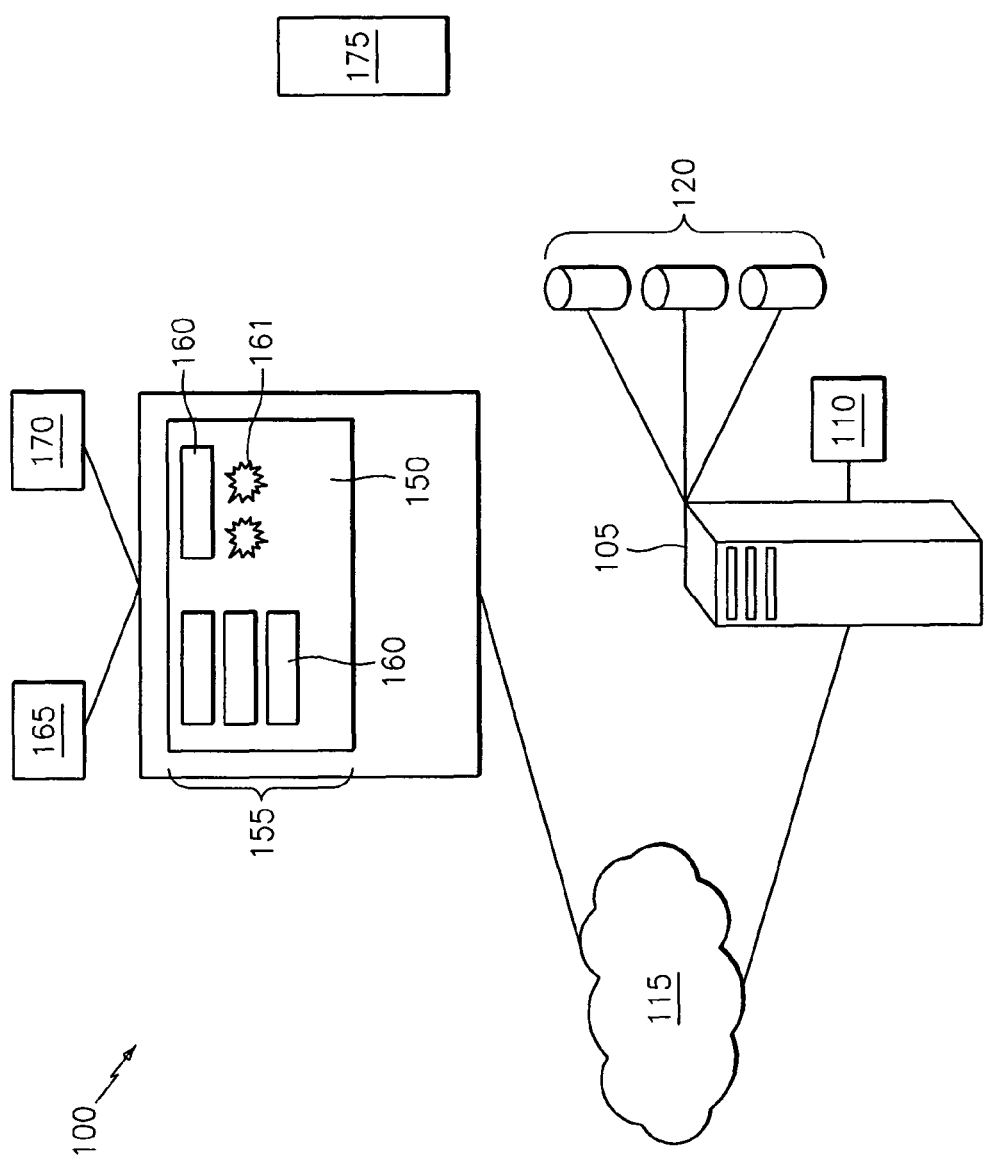
FIG. 1 is a block diagram illustrating a system in which program content conversion and presentation services may be implemented in accordance with exemplary embodiments.

FIG. 1 illustrates an embodiment of system 100 in which a content conversion and presentation enabled service for television and Internet Protocol television is provided. System 100 generally includes content services provider system 105 in communication with program receiving device 150 via network 115. The content services provider system 105 facilitates the content conversion and presentation-enabled services described herein.

Program receiving device 150 includes display screen 155 for viewing content provided by the content services provider system 105 and selected by a viewer. Current program content refers to programming that includes voluminous text, accompanying video images etc. Current program content can also include other content including text such as, but not limited to, an onscreen programming guide. Display screen 155 of program receiving device 150 generally includes a plurality of text fields 160 that provides numerous types of text information relating to the program content. For example, each text field 160 can include one aspect of weather-related information, such as, but not limited to: temperature, barometric pressure, humidity, allergy conditions, smog alerts, weather forecast, etc. Display screen 155 can also include accompanying graphical images, video, etc., generally represented by image 161.

Program receiving device 150 presents programming content for viewing to users of the content conversion and presentation services. Program receiving device 150 can be any type of network-enabled device that is capable of presenting programming content to viewers. In exemplary embodiments, program-receiving device 150 can be a high-definition television via TV or IPTV, a personal computer, a portable computing device (e.g., personal digital assistant), a digital music player (e.g., MP3 player), cellular telephone (e.g., a 3G cell phone), etc.

Program receiving device 150 can also include auxiliary devices, such as set top box 165, personal video recorder (PVR) 170, and remote control 175. Set top box 165 provides a connection between the program receiving device 150 and external sources of signals, converting the signals into content that is displayed on a screen of the device 150. Where program receiving device 150 is IPTV, set top box 165 includes a computer that provides bi-directional communications between network 115 and program receiving device 150 and decodes the video streaming media received as content programming and onscreen programming information from content services provider system 105. Remote control 175 can include options (e.g., interface) enabled by the content conversion and presentation services for selecting content that is capable of being converted and presented as described herein, for display, as well as navigating text fields 160 (as discussed above and further below) as well as other images, videos, and in general, graphic images 161, displayed on display panel 155. PVR 170 can be communicatively coupled to program receiving device 150 and records programming as configured by a user of the program-receiving device 150.

In exemplary embodiments, content services provider system 105 is implemented by a host system (e.g., a high-speed processing device) that provides content to its customers (e.g., a user of program receiving device 150), such as television programs, premium programming services, video on demand content, and Internet/Web content (e.g., podcasts, streaming media, etc.). System 100 can be used for applications that include voluminous text, such as, but not limited to news (e.g., Yahoo® news, etc.) e-commerce applications (e.g., Ebay®, Amazon®, etc.), commercials with product descriptions, etc. In exemplary embodiments, this content is transmitted to customers via a broadband connection over an Internet Protocol (IP)-based network (e.g., network 115). Content services provider system 105 can also provide an onscreen programming guide to customers (e.g., user of program receiving device 150) that provides information about current and future programming available via the content providers' services. Programming information provided by the onscreen programming guide may include current and future program listings including program titles, primary actors/actresses, begin time, duration of program, a year in which the program was produced, and a brief text description of the program.

In exemplary embodiments, content services provider system 105 executes an application for implementing the content conversion and presentation-enabled service for television and Internet Protocol television described herein. This application is referred to as content conversion and presentation application 110. The content conversion and presentation application 110 and related content conversion and presentation enabled services may be implemented as a single program executing on the content services provider system 105, or may be separate physical components that interact via, e.g., an application programming interface or other technique. In alternative exemplary embodiments, content conversion and presentation application 110 can execute locally on program receiving device 150. The functionality of content conversion and presentation enabled services provided via content conversion and presentation application 110 are discussed further with respect to FIG. 2 below. Content conversion and presentation application 110 receives content from a variety of content sources (e.g., motion picture industry, television networks, Internet-based content providers, etc.)

System 100 further includes a plurality of storage devices 120 that are communicatively coupled to the content services provider system 105 (e.g., via physical cabling or wireless means). Additionally, each storage device 120 may be in communication with content services provider system 105 via one or more networks (e.g., network 115). In a one implementation, each storage device 120 is generally representative of a given play list. A play list is associated with a particular program screen. For example, a play list can be generated for a given screen that is displayed for a view on display panel 155 of program receiving device. Each play list therefore includes associated text fields 160 are subsequently displayed for the viewer on display panel 155. Therefore, as a viewer is browsing through different channels, and therefore different program content, as each new channel and program content are displayed as display panel 155, a different play list is accessed by program receiving device 150 from content services provider system 105, which can be via set top box 165. It is understood that play lists contain data related to text fields 160, such as voice stream data as discussed further below. However, it is further understood that play lists can include other data such as but not limited to images 161. In other embodiments, play lists can include programming content, as well as programming schedules for the content (e.g., onscreen programming guide information). In exemplary embodiments, the storage device 120 stores records of programming events scheduled for transmission to customers, such as program receiving device 150. These records, in turn, include content conversion and presentation information that is utilized by the content conversion and presentation application 110.

In accordance with exemplary embodiments, network 115 is an IP-based network that transmits programming content from content services provider system 105 to customers, such as program receiving device 150 via a broadband connection. In exemplary embodiments, network 115 is a managed IP network administered by a service provider, which can control bandwidth and quality of service for voice streams. Network 115 may be implemented in a wireless fashion, e.g., using wireless protocols and technologies, such as WiFi, WiMax, etc.

Figure 2:
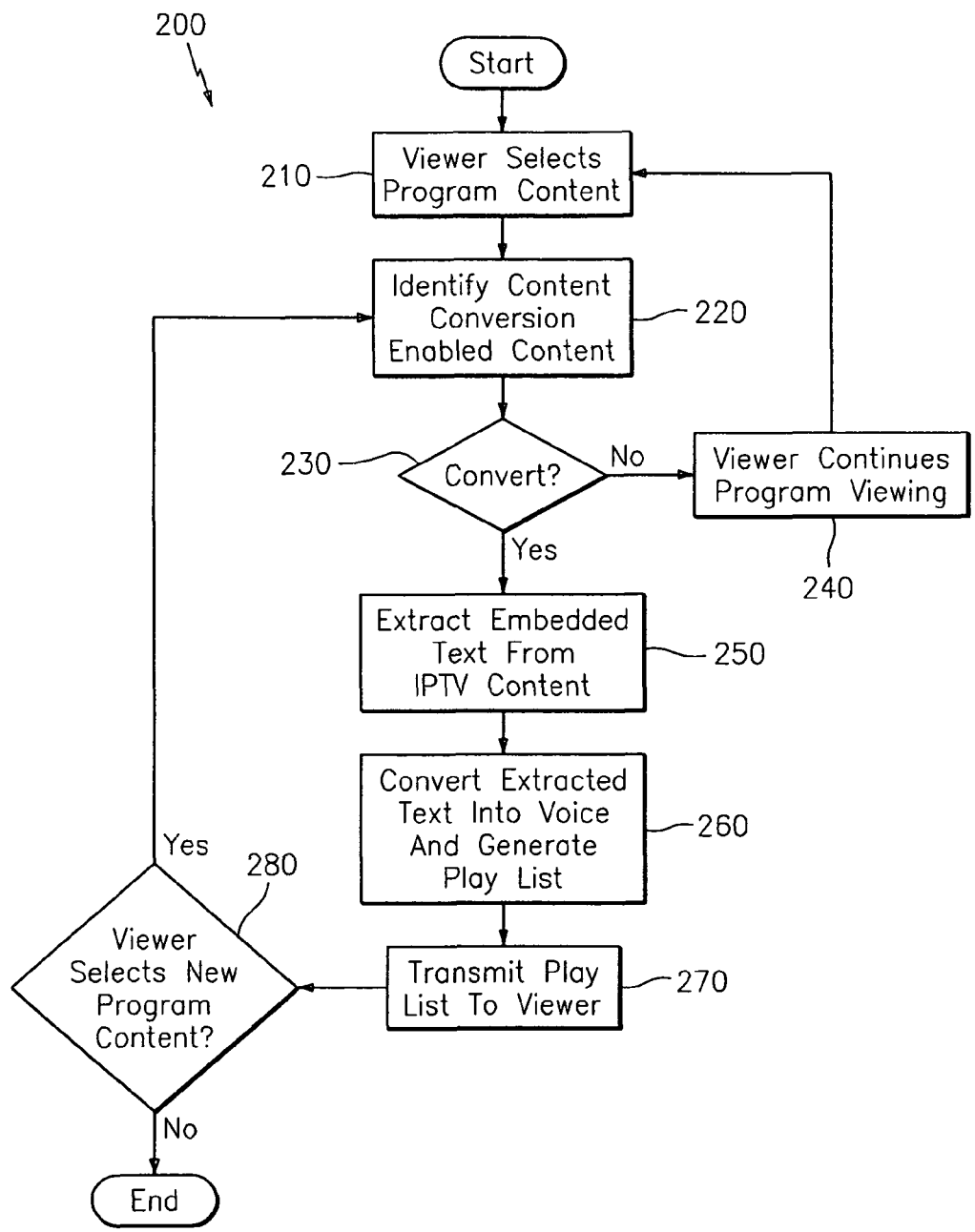
FIG. 2 is a flow diagram describing a process for implementing program content conversion and presentation services in exemplary embodiments.

FIG. 2 illustrates an embodiment of a method 200 of a content conversion and presentation enabled service for TV and IPTV. The method begins whereby a viewer who is using program-receiving device 150 selects some type of program content at step 210. The program content can be an application, as described above, which includes text that can be difficult to visually read. In the aforementioned example, the program content can be a weather web application. If the program content has been previously content conversion and presentation enabled, the content conversion and presentation enabled content is identified from the program content that the viewer has chosen at step 220. In one implementation, a program play list as described above has already been associated with such program content. As is described further below with respect to FIG. 3, play lists can be generated in a variety of ways. For example, a first play list can be generated that does not include converted content. If the viewer elected content conversion and presentation, then the content conversion and presentation is generated thereby generating a presenting a new play list including the converted program content. It is understood that there are a variety of ways that play lists can be generated without departing from the embodiments described herein.

Each play list, for given program content, can include multiple voice streams, that is, a voice stream for each of text field 160 as described above. Program content can include primarily multiple text fields 160 and graphical images 161. As described, each text field 160 includes its own voice stream. Therefore, as a channel or application that includes content conversion and presentation enabled services is selected, the viewer can be given the option to convert text fields 160 into voice at step 230. In one implementation, the associated play list can include an instruction that is displayed on display screen 155 that alerts the viewer that the selected program content is content conversion and presentation enabled. For example, on appropriate information screens of IPTV applications, a button can be displayed to prompt viewers that the content conversion and presentation capability is available. If the button is clicked, the text in the IPTV content is extracted, a content conversion and presentation engine (which includes a text-to-voice/text-to-speech (TTS) engine) converts the text into voice and the voice is played by program receiving device 150, for example, via the IPTV media player, as described herein. In general, content conversion and presentation application 110 provides the viewer the capability to navigate among the several text fields 160 via navigational tools such as those present on set top box 165 and/or remote control 175. By choosing a particular text field 160, the associated voice stream can either automatically be played or can be selected to be played by the viewer. The viewer can further have the option to continue having the text in text fields 160 to be displayed or the remove the text from text fields 160. If the viewer chooses not to elect the content conversion and presentation services at step 230, then the viewer continues to view the program at step 240. The process can be repeated if the viewer selects new program content at step 210.

When the user does select to have text converted to voice at step 230, embedded text can be contemporaneously extracted from IPTV content included in the associated play list at step 250, converted to voice at step 260, in which a ply list is further generated, and streamed to program receiving device 150 at step 270, which can be via set top box 165. In another implementation, a pre-configured voice stream with an associated text field 160 may be generated at content services provider system 105, and pre-associated with the play list such that the converted content is ready to be streamed to program receiving device 150 upon the user's request at step 230. Content services provider system 105 therefore further includes software to include the play lists, which can be a module of content conversion and presentation application 110. Therefore, it is appreciated that text can be converted to voice upon deployment of an IPTV application such that voice is automatically grouped and transmitted with a play list and is immediately available to a viewer if and when a request to convert to voice is made. In such an implementation, voice conversion and play list construction for given text occurs once in each application and is stored on the server hosted by the service provider. All viewers' devices can therefore share the same voice play list for each IPTV application. Stored play lists can therefore be played more than once per viewers' preferences.

Content conversion and presentation application 110 therefore can include modules that listen to the text stream from a content provider (e.g., weather.com). The text stream provided from the provider is generally in a particular format, which may or may not vary among different content providers. Content conversion and presentation application 110 then uses the provided format to pull or extract the fields out of the text stream. The extracted text from the field is then converted into the voice stream, which is then associated with the particular text field creating a relationship between the text and the voice stream via the text field. More specifically, content conversion and presentation application 110 can identify different pieces of meta-data, extract those pieces of meta-data from the text stream and generate play lists that include text fields 160 corresponding to the meta-data elements. For example, the text stream (e.g., digital content) can include the meta-data element, temperature, which can be extracted and associated with a text field 160. Subsequently, a text field 160 displaying the temperature text in the text field 160 can be displayed on display screen 155. Similar meta-data for barometric pressure, humidity, forecast, etc., can be extracted from the text stream, associated with respective text fields 160 and displayed on display screen 155. Furthermore, in generating the play list, the extracted text that is associated with a given text field 160 is also coupled with the associated voice stream such that transmission of the text and voice is immediately available to the viewer upon request. Similarly, the play list can include any graphical images that are added to the play list and subsequently displayed as graphical elements 161 on the display screen 155.

Figure 3:
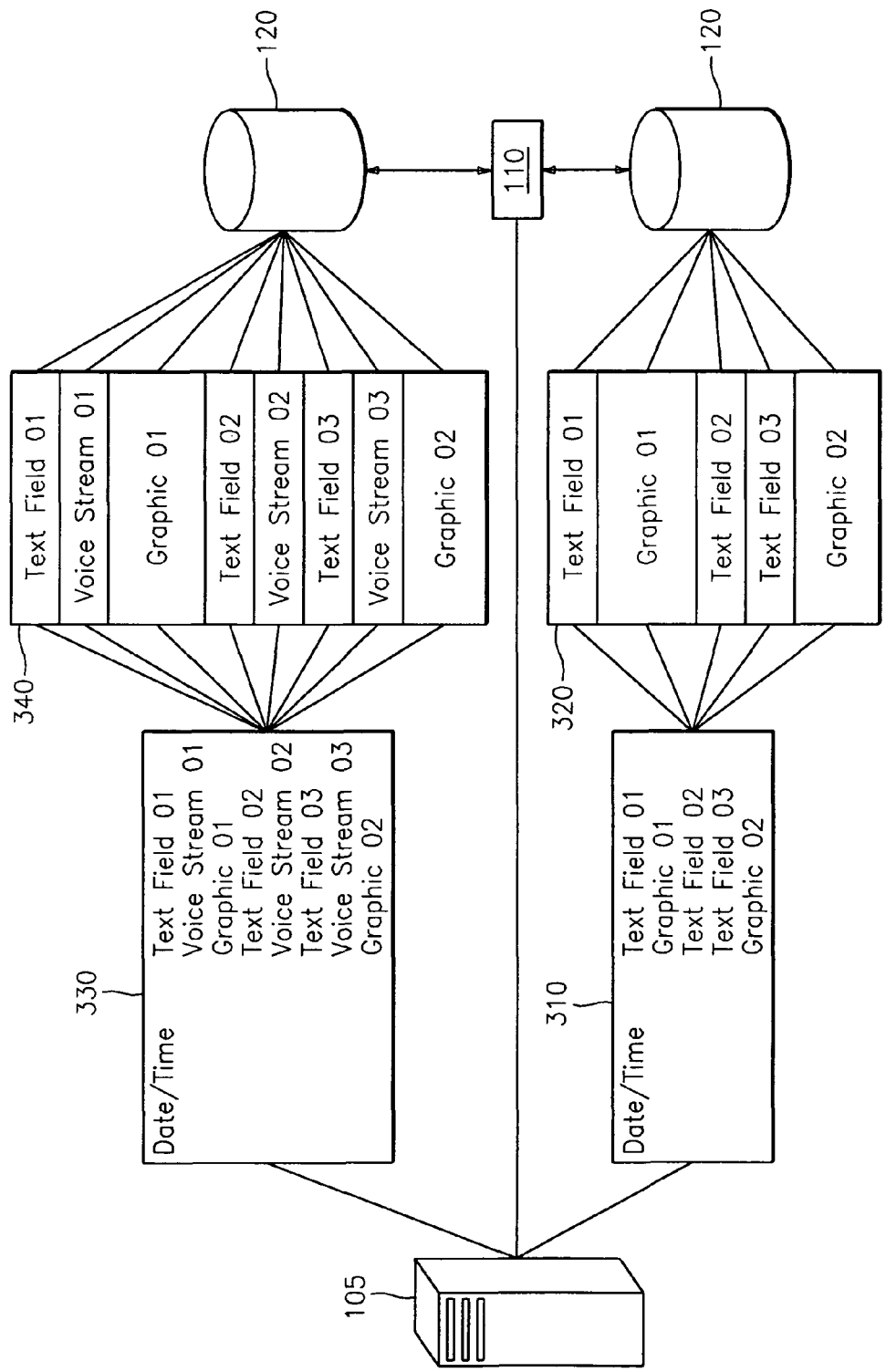
FIG. 3 is a block diagram illustrating a system and play lists in which program content conversion and presentation services may be implemented in accordance with exemplary embodiments.

FIG. 3 is a block diagram illustrating a system and play lists 310, 330 in which program content conversion and presentation services may be implemented in accordance with exemplary embodiments. FIG. 3 illustrates a portion of system 100 as illustrated in FIG. 1. As such, it is understood that server 105 is connected to network 115, which is coupled to the other elements as shown in FIG. 1. As discussed above, system 100 includes storage media 120, which can include individual play lists 310, 330 and associated data structures 320, 340. It is appreciated that the data structures can be stored in storage media 120 in a variety of ways. For example, text data can be stored in a first set of memory addresses and the voice data can be stored in a second set of memory addresses. Additionally, there can be included in the data structure an index of memory addresses with an association between the related text data and voice data.

The play lists 310, 330 and associated data structures 320, 340 are illustrated as including specific text fields, voice streams and graphics. It is understood that these specific representations are for illustrative purposes and it is further understood that there are many other contemplated combinations in other embodiments. In general, play list 310 can be generated for program content. Play list 310 is associated with data structure 320 and stored in storage medium 120. When a viewer chooses the program content as described above with respect to FIG. 2, play list 310 is transmitted to the program-receiving device 150. In generated play list 310, a graphic, say graphic 01, can be included that displays the button that alerts the viewer that content conversion and presentation is available for that chosen program content. If the user chooses the content conversion and presentation services as described, then content conversion and presentation application 110 is accessed, which subsequently performs that content conversion as described and generates play list 330, which includes the associated voice streams.

In another implementation, when a viewer chooses program content that includes the content conversion and presentation services, play list 330 is generated and transmitted regardless of whether or not the viewer chooses to elect the content conversion and presentation services. Therefore, play list 330 includes the voice streams even though the viewer may not choose to elect the services.

Referring again to FIG. 1, it is therefore appreciated that content services provider system 105 includes a media server capable of streaming voice to each set top box of all subscribers to the content conversion and presentation enabled services. Content services provider system 105 further enables a content conversion and presentation engine on the server via content conversion and presentation application 110. In addition, set top box 165 and/or program receiving device 150 includes functionality to receive and process voice data streamed from content services provider system 105. In a one implementation, the voice stream can be multi-cast to the various subscribers/users via network 115. In addition, the text that has been converted to speech is presented to the users as described. Although the play lists can be contemporaneously generated as described above, the play lists can be available to all users at once because the play lists are located on the back-end server in content services provider system 105. In general, in embodiments where play lists are contemporaneously generated, content conversion and presentation application 110 can be locally available on set top box 165 and/or program receiving device 150.

In general, the method 200 monitors the viewer's activity to make on-going decisions whether or not text conversion to voice is to be implemented. It is understood that all program content may not be available for the content conversion and presentation enabled service. Therefore, at step 230, it is understood that content conversion and presentation services may not be available. In addition, as the user chooses different program content, the content conversion and presentation methodology is repeated at step 280.

The following example expands on the basic weather applications as discussed herein. A viewer may select a weather web application (e.g., accu-weather or weather.com or any channel that delivers content via IPTV). In a one implementation, a viewer can enter his/her zip code or similar identifying data. The web application displays a text description of weather, in this case via text fields 160. Upon selection by the viewer the text fields are converted to speech (e.g., text fields: temperature, humidity, allergy conditions, are subsequently audibly read to the viewers). By choosing different weather text fields via navigational tool as discussed above, the application can audibly read to the viewer. In another implementation, once the viewer has decided to enable the content conversion and presentation service, the user can have the option to have all fields audibly read to him/her without having to navigate individual fields. Therefore, the application can thus audibly read from field to field without any user action (e.g., the user does not need to physically click on a field). The content provider, e.g., weather.com can provide the content to the service provider. The service provider formats the play list, screens, fields, etc., and the content conversion and presentation component for presentation to users.

As described above, the exemplary embodiments can be in the form of computer-implemented processes and apparatuses for practicing those processes. The exemplary embodiments can also be in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the exemplary embodiments. The exemplary embodiments can also be in the form of computer program code, for example, whether stored in a storage medium, loaded into and/or executed by a computer, or loaded into and/or executed by a computer, wherein, when the computer program code is loaded into an executed by a computer, the computer becomes an apparatus for practicing the exemplary embodiments. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method comprising:

extracting, by a computer processor in a content services provider system, embedded text from program content, the content services provider system providing program content to a user over a network;

converting, by the computer processor in the content services provider system, the embedded text extracted from the program content to voice data, wherein the embedded text includes a plurality of text fields, each text field converted to individual voice data;

creating a playlist comprising the embedded text and corresponding voice data such that the voice data is generated prior to a request for voice data from the user, the playlist including the embedded text and corresponding voice data;

storing the playlist on a storage device coupled to the content services provider system;

transmitting the program content and the playlist including the embedded text and corresponding voice data over the network to a program receiving device;

providing the program content including the embedded text and an indicator at a program screen of the program receiving device, the indicator specifying availability of the voice data, each text field converted to individual voice data being individually accessed by a navigation tool of the program receiving device;

in response to selection of a text field converted to individual voice data via the navigation tool of the program receiving device, providing the voice data from the playlist for the embedded text of the text field corresponding to the program content; and displaying embedded text of the text field while playing streamed voice, the streamed voice representing the voice data corresponding to the embedded text;

wherein the program content includes television programming and an onscreen programming guide;

wherein creating the playlist includes:

configuring a data structure for the play list;

storing the embedded text for the play list in a first set of memory addresses of the data structure;

storing the voice data in a second set of memory addresses of the data structure; and providing an index of the first and second set of memory addresses with an association between the embedded text and the voice data for the play list.

2. The method as claimed in claim 1 wherein the onscreen programming guide comprises program titles, actors, begin time, and a brief description of the program content.

3. The method as claimed in claim 1 wherein the program content includes a text stream having a format provided by a content services provider.

4. The method as claimed in claim 1 wherein the program content includes video on demand programming.

5. The method as claimed in claim 1 wherein the program content further includes premium channel programming.

6. The method as claimed in claim 1 wherein the play list includes image data.

7. The method as claimed in claim 1, wherein the program content corresponds to ecommerce.

8. The method as claimed in claim 1 wherein the program content comprises video metadata;

wherein the voice data for the embedded text comprises artist name, title of the program content, genre, and artist biography.

9. The method as claimed in claim 1 wherein the program content is Internet Protocol television content.

* * * * *